(12) United States Patent
Tamaki et al.

(10) Patent No.: US 7,524,562 B2
(45) Date of Patent: Apr. 28, 2009

(54) METHOD OF IMPROVING ABRASION RESISTANCE OF PLASTIC ARTICLE USING FUNCTIONALIZED POLYMERS AND ARTICLE PRODUCED THEREBY

(75) Inventors: Ryo Tamaki, Clifton Park, NY (US); Steven Thomas Rice, Scotia, NY (US); Hieu Minh Duong, Clifton Park, NY (US); Xian-Zhi Zhou, Leonia, NJ (US); Gary Charles Davis, Albany, NY (US); Elliott West Shanklin, Altamont, NY (US)

(73) Assignee: Sabic Innovative Plastics IP B.V. (NL)

( * ) Notice: Subject to any disclaimer, the term of this patent is extended or adjusted under 35 U.S.C. 154(b) by 368 days.

(21) Appl. No.: 11/253,116

(22) Filed: Oct. 18, 2005

(65) Prior Publication Data

US 2007/0085242 A1    Apr. 19, 2007

(51) Int. Cl.
  *C08G 63/64* (2006.01)
  *C08G 63/88* (2006.01)
  *C08G 64/16* (2006.01)
  *C08G 64/40* (2006.01)

(52) U.S. Cl. .................. 428/412; 522/163; 525/439; 525/462; 525/464; 525/469; 528/25; 528/26; 528/29; 528/193; 528/195; 528/204

(58) Field of Classification Search .................. None
See application file for complete search history.

(56) References Cited

U.S. PATENT DOCUMENTS

| | | | |
|---|---|---|---|
| 3,986,997 A | 10/1976 | Clark | |
| 4,027,073 A | 5/1977 | Clark | |
| 4,238,596 A | 12/1980 | Quinn | |
| 4,238,597 A | 12/1980 | Markezich et al. | |
| 4,239,798 A | 12/1980 | Schroeter et al. | |
| 4,333,809 A * | 6/1982 | Schreckenberg et al. | .... 522/163 |
| 4,410,594 A | 10/1983 | Olson | |
| 4,503,126 A | 3/1985 | Phillips et al. | |
| 4,939,185 A * | 7/1990 | Nelson et al. | ............... 523/136 |
| 5,198,527 A * | 3/1993 | Marks et al. | ............... 528/198 |
| 5,318,827 A | 6/1994 | Logan et al. | |
| 6,294,647 B1 | 9/2001 | Brunelle et al. | |
| 6,306,507 B1 | 10/2001 | Brunelle et al. | |
| 6,387,379 B1 | 5/2002 | Goldberg et al. | |
| 6,492,481 B1 | 12/2002 | Davis et al. | |
| 6,596,843 B2 | 7/2003 | Brunelle et al. | |
| 2005/0113535 A1* | 5/2005 | Glasgow et al. | ............. 525/462 |
| 2007/0088095 A1* | 4/2007 | Tamaki et al. | ............... 522/163 |

FOREIGN PATENT DOCUMENTS

| JP | 01075521 | * 3/1989 |
|---|---|---|
| JP | 2004292598 | * 10/2004 |

OTHER PUBLICATIONS

International Search Report dated Mar. 2, 2007.
Abstract: Ikuo, et al., Japanese Publication No. 01045521A, Date of Publication: Mar. 22, 1989 (1 pg).
Abstract: Hiroshi, et al., Japanese Publication No. 02191618A, Date of Publication: Jul. 27, 1990 (1 pg).
Abstract: Osami, et al., Japanese Publication No. 02208325A, Date of Publication: Aug. 17, 1990 (1 pg).
Abstract: Toshinori, et al., Japanese Publication No. 03296536A, Date of Publication: Dec. 27, 1991 (1 pg).

* cited by examiner

*Primary Examiner*—David Buttner
(74) *Attorney, Agent, or Firm*—Cantor Colburn LLP

(57) ABSTRACT

The invention includes embodiments that relate to a method of improving the abrasion resistance of a plastic article. The method comprises: (a) providing a composition comprising at least one e-beam active thermoplastic polymeric material; (b) forming an article from the composition of step (a); and (c) exposing the article formed in step (b) to an electron beam source. The invention also includes embodiments that relate to an article comprising an abrasion resistant surface.

22 Claims, No Drawings

US 7,524,562 B2

METHOD OF IMPROVING ABRASION RESISTANCE OF PLASTIC ARTICLE USING FUNCTIONALIZED POLYMERS AND ARTICLE PRODUCED THEREBY

BACKGROUND

The invention includes embodiments that relate to a method of improving the abrasion resistance of a plastic article. The invention also includes embodiments that relate to an article comprising an abrasion resistant surface.

Thermoplastic polymers such as polycarbonate (PC) and resorcinol polyarylate-polycarbonate copolymers (SLX) are prone to scratch and mar type damage. The susceptibility of a polymer to scratching or marring can severely limit its utility in commercial applications requiring a scratch-free or mar-free appearance.

To avoid or at least minimize scratch and mar damage, hard coatings have been applied on the surface of a variety of polymers, especially polycarbonate. This technique has been utilized advantageously in several areas such as glazing applications. Although the application of a hard coating on the surface of a polymer provides in some instances improved abrasion resistance, the application of the hard-coat introduces additional process steps and tends to increase the processing time and cost. In addition, once a hard-coat is in contact with the surface (for example, the surface of a polycarbonate film), post-processing options are limited due to the presence of the hard-coat. Additional limitations are encountered as articles comprising a hard-coated polymer "weather" and the hard-coat erodes from the polymer surface, and the polymer once again becomes susceptible to scratching and marring. Additionally, hard-coats adhering to a polymer surface may delaminate.

Therefore, enhancement of the abrasion resistance of the parent thermoplastic polymers, especially that of parent PC and SLX polymers, represents a highly desirable objective. Moreover, plastic articles derived from these thermoplastic polymers having improved abrasion properties are also desired.

BRIEF DESCRIPTION

In one embodiment, the present invention provides a method for improving the abrasion resistance of a plastic article. The method comprises: (a) providing a composition comprising at least one e-beam active thermoplastic polymeric material; (b) forming an article from the composition of step (a); and (c) exposing the article formed in step (b) to an electron-beam source.

In a second embodiment, the invention provides a method for improving the abrasion resistance of a plastic article comprising at least one e-beam active thermoplastic polymeric material selected from the group consisting of a polycarbonate, a co-polycarbonate and a co-polyestercarbonate. The method comprises: (a) providing a composition comprising at least one e-beam active thermoplastic polymeric material selected from the group consisting of polycarbonates, co-polycarbonates, and co-polyestercarbonates; (b) forming an article from the composition of step (a); and (c) exposing the article formed in step (b) to an electron beam source.

In one embodiment, the invention provides a plastic article comprising an abrasion resistant surface; wherein said article is prepared by a method comprising: (a) providing a composition comprising at least one e-beam active thermoplastic polymeric material selected from the group consisting of polycarbonates, co-polycarbonates, and co-polyestercarbonates; (b) forming an article from the composition of step (a); and (c) exposing the article formed in step (b) to an electron beam source.

DETAILED DESCRIPTION

In the following specification and the claims which follow, reference will be made to a number of terms which shall be defined to have the following meanings.

The singular forms "a", "an" and "the" include plural referents unless the context clearly dictates otherwise. Approximating language, as used herein throughout the specification and claims, may be applied to modify any quantitative representation that could permissibly vary without resulting in a change in the basic function to which it is related. Accordingly, a value modified by a term or terms, such as "about", are not to be limited to the precise value specified. In some instances, the approximating language may correspond to the precision of an instrument for measuring the value.

As used herein, the term "aromatic radical" refers to an array of atoms having a valence of at least one comprising at least one aromatic group. The array of atoms having a valence of at least one comprising at least one aromatic group may include heteroatoms such as nitrogen, sulfur, selenium, silicon and oxygen, or may be composed exclusively of carbon and hydrogen. As used herein, the term "aromatic radical" includes but is not limited to phenyl, pyridyl, furanyl, thienyl, naphthyl, phenylene, and biphenyl radicals. As noted, the aromatic radical contains at least one aromatic group. The aromatic group is invariably a cyclic structure having 4n+2 "delocalized" electrons where "n" is an integer equal to 1 or greater, as illustrated by phenyl groups (n=1), thienyl groups (n=1), furanyl groups (n=1), naphthyl groups (n=2), azulenyl groups (n=2), anthraceneyl groups (n=3) and the like. The aromatic radical may also include nonaromatic components. For example, a benzyl group is an aromatic radical which comprises a phenyl ring (the aromatic group) and a methylene group (the nonaromatic component). Similarly a tetrahydronaphthyl radical is an aromatic radical comprising an aromatic group ($C_6H_3$) fused to a nonaromatic component —$(CH_2)_4$—. For convenience, the term "aromatic radical" is defined herein to encompass a wide range of functional groups such as alkyl groups, alkenyl groups, alkynyl groups, haloalkyl groups, haloaromatic groups, conjugated dienyl groups, alcohol groups, ether groups, aldehydes groups, ketone groups, carboxylic acid groups, acyl groups (for example carboxylic acid derivatives such as esters and amides), amine groups, nitro groups, and the like. For example, the 4-methylphenyl radical is a $C_7$ aromatic radical comprising a methyl group, the methyl group being a functional group which is an alkyl group. Similarly, the 2-nitrophenyl group is a $C_6$ aromatic radical comprising a nitro group, the nitro group being a functional group. Aromatic radicals include halogenated aromatic radicals such as 4-trifluoromethylphenyl, hexafluoroisopropylidenebis(4-phen-1-yloxy) (i.e., —OPhC($CF_3$)$_2$PhO—), 4-chloromethylphen-1-yl, 3-trifluorovinyl-2-thienyl, 3-trichloromethylphen-1-yl (i.e., 3-CCl$_3$Ph-), 4-(3-bromoprop-1-yl)phen-1-yl (i.e., 4-BrCH$_2$CH$_2$CH$_2$Ph-), and the like. Further examples of aromatic radicals include 4-allyloxyphen-1-oxy, 4-aminophen-1-yl (i.e., 4-H$_2$NPh-), 3-aminocarbonylphen-1-yl (i.e., NH$_2$COPh-), 4-benzoylphen-1-yl, dicyanomethylidenebis(4-phen-1-yloxy) (i.e., —OPhC(CN)$_2$PhO—), 3-methylphen-1-yl, methylenebis(4-phen-1-yloxy) (i.e., —OPhCH$_2$PhO—), 2-ethylphen-1-yl, phenylethenyl, 3-formyl-2-thienyl, 2-hexyl-5-furanyl, hexamethylene-1,6-bis(4-phen-1-yloxy) (i.e., —OPh(CH$_2$)$_6$PhO—), 4-hydroxymethylphen-1-yl (i.e., 4-HOCH$_2$Ph-), 4-mercaptomethylphen-1-yl (i.e., 4-HSCH$_2$Ph-), 4-methylthiophen-1-yl (i.e., 4-CH$_3$SPh-), 3-methoxyphen-1-yl, 2-methoxycarbonylphen-1-yloxy (e.g., methyl salicyl), 2-nitromethylphen-1-yl (i.e., 2-NO$_2$CH$_2$Ph), 3-trimethylsilylphen-1-yl, 4-t-butyldimethylsilylphenl-1-yl, 4-vinylphen-1-yl, vinylidenebis (phenyl), and the like. The term "a C$_3$-C$_{10}$ aromatic radical" includes aromatic radicals containing at least three but no more than 10 carbon atoms. The aromatic radical 1-imidazolyl (C$_3$H$_2$N$_2$—) represents a C$_3$ aromatic radical. The benzyl radical (C$_7$H$_7$—) represents a C$_7$ aromatic radical.

As used herein the term "cycloaliphatic radical" refers to a radical having a valence of at least one, and comprising an array of atoms which is cyclic but which is not aromatic. As defined herein a "cycloaliphatic radical" does not contain an aromatic group. A "cycloaliphatic radical" may comprise one or more noncyclic components. For example, a cyclohexylmethyl group (C$_6$H$_{11}$CH$_2$—) is a cycloaliphatic radical which comprises a cyclohexyl ring (the array of atoms which is cyclic but which is not aromatic) and a methylene group (the noncyclic component). The cycloaliphatic radical may include heteroatoms such as nitrogen, sulfur, selenium, silicon and oxygen, or may be composed exclusively of carbon and hydrogen. For convenience, the term "cycloaliphatic radical" is defined herein to encompass a wide range of functional groups such as alkyl groups, alkenyl groups, alkynyl groups, haloalkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylcyclopent-1-yl radical is a C$_6$ cycloaliphatic radical comprising a methyl group, the methyl group being a functional group which is an alkyl group. Similarly, the 2-nitrocyclobut-1-yl radical is a C$_4$ cycloaliphatic radical comprising a nitro group, the nitro group being a functional group. A cycloaliphatic radical may comprise one or more halogen atoms which may be the same or different. Halogen atoms include, for example; fluorine, chlorine, bromine, and iodine. Cycloaliphatic radicals comprising one or more halogen atoms include 2-trifluoromethylcyclohex-1-yl, 4-bromodifluoromethylcyclooct-1-yl, 2-chlorodifluoromethylcyclohex-1-yl, hexafluoroisopropylidene-2,2-bis (cyclohex-4-yl) (i.e., —C$_6$H$_{10}$C(CF$_3$)$_2$C$_6$H$_{10}$—), 2-chloromethylcyclohex-1-yl, 3-difluoromethylenecyclohex-1-yl, 4-trichloromethylcyclohex-1-yloxy, 4-bromodichloromethylcyclohex-1-ylthio, 2-bromoethylcyclopent-1-yl, 2-bromopropylcyclohex-1-yloxy (e.g., CH$_3$CHBrCH$_2$C$_6$H$_{10}$—), and the like. Further examples of cycloaliphatic radicals include 4-allyloxycyclohex-1-yl, 4-aminocyclohex-1-yl (i.e., H$_2$NC$_6$H$_{10}$—), 4-aminocarbonylcyclopent-1-yl (i.e., NH$_2$COC$_5$H$_8$—), 4-acetyloxycyclohex-1-yl, 2,2-dicyanoisopropylidenebis(cyclohex-4-yloxy) (i.e., —OC$_6$H$_{10}$C(CN)$_2$C$_6$H$_{10}$O—), 3-methylcyclohex-1-yl, methylenebis(cyclohex-4-yloxy) (i.e., —OC$_6$H$_{10}$CH$_2$C$_6$H$_{10}$O—), 1-ethylcyclobut-1-yl, cyclopropylethenyl, 3-formyl-2-terahydrofuranyl, 2-hexyl-5-tetrahydrofuranyl, hexamethylene-1,6-bis(cyclohex-4-yloxy) (i.e., —OC$_6$H$_{10}$(CH$_2$)$_6$C$_6$H$_{10}$O—), 4-hydroxymethylcyclohex-1-yl (i.e., 4-HOCH$_2$C$_6$H$_{10}$—), 4-mercaptomethylcyclohex-1-yl (i.e., 4-HSCH$_2$C$_6$H$_{10}$—), 4-methylthiocyclohex-1-yl (i.e., 4-CH$_3$SC$_6$H$_{10}$—), 4-methoxycyclohex-1-yl, 2-methoxycarbonylcyclohex-1-yloxy (2-CH$_3$OCOC$_6$H$_{10}$O—), 4-nitromethylcyclohex-1-yl (i.e., NO$_2$CH$_2$C$_6$H$_{10}$—), 3-trimethylsilylcyclohex-1-yl, 2-t-butyldimethylsilylcyclopent-1-yl, 4-trimethoxysilylethylcyclohex-1-yl (e.g., (CH$_3$O)$_3$SiCH$_2$CH$_2$C$_6$H$_{10}$—), 4-vinylcyclohexen-1-yl, vinylidenebis (cyclohexyl), and the like. The term "a C$_3$-C$_{10}$ cycloaliphatic radical" includes cycloaliphatic radicals containing at least three but no more than 10 carbon atoms. The cycloaliphatic radical 2-tetrahydrofuranyl (C$_4$H$_7$O—) represents a C$_4$ cycloaliphatic radical. The cyclohexylmethyl radical (C$_6$H$_{11}$CH$_2$—) represents a C$_7$ cycloaliphatic radical.

As used herein the term "aliphatic radical" refers to an organic radical having a valence of at least one consisting of a linear or branched array of atoms which is not cyclic. Aliphatic radicals are defined to comprise at least one carbon atom. The array of atoms comprising the aliphatic radical may include heteroatoms such as nitrogen, sulfur, silicon, selenium and oxygen or may be composed exclusively of carbon and hydrogen. For convenience, the term "aliphatic radical" is defined herein to encompass, as part of the "linear or branched array of atoms which is not cyclic" a wide range of functional groups such as alkyl groups, alkenyl groups, alkynyl groups, haloalkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylpent-1-yl radical is a C$_6$ aliphatic radical comprising a methyl group, the methyl group being a functional group which is an alkyl group. Similarly, the 4-nitrobut-1-yl group is a C$_4$ aliphatic radical comprising a nitro group, the nitro group being a functional group. An aliphatic radical may be a haloalkyl group which comprises one or more halogen atoms which may be the same or different. Halogen atoms include, for example; fluorine, chlorine, bromine, and iodine. Aliphatic radicals comprising one or more halogen atoms include the alkyl halides trifluoromethyl, bromodifluoromethyl, chlorodifluoromethyl, hexafluoroisopropylidene, chloromethyl, difluorovinylidene, trichloromethyl, bromodichloromethyl, bromoethyl, 2-bromotrimethylene (e.g., —CH$_2$CHBrCH$_2$—), and the like. Further examples of aliphatic radicals include allyl, aminocarbonyl (i.e., —CONH$_2$), carbonyl, 2,2-dicyanoisopropylidene (i.e., —CH$_2$C(CN)$_2$CH$_2$—), methyl (i.e., —CH$_3$), methylene (i.e., —CH$_2$—), ethyl, ethylene, formyl (i.e., —CHO), hexyl, hexamethylene, hydroxymethyl (i.e., —CH$_2$OH), mercaptomethyl (i.e., —CH$_2$SH), methylthio (i.e., —SCH$_3$), methylthiomethyl (i.e., —CH$_2$SCH$_3$), methoxy, methoxycarbonyl (i.e., CH$_3$OCO—), nitromethyl (i.e., —CH$_2$NO$_2$), thiocarbonyl, trimethylsilyl (i.e., (CH$_3$)$_3$Si—), t-butyldimethylsilyl, 3-trimethyoxysilylpropyl (i.e., (CH$_3$O)$_3$SiCH$_2$CH$_2$CH$_2$—), vinyl, vinylidene, and the like. By way of further example, a C$_1$-C$_{10}$ aliphatic radical contains at least one but no more than 10 carbon atoms. A methyl group (i.e., CH$_3$—) is an example of a C$_1$ aliphatic radical. A decyl group (i.e., CH$_3$(CH2)$_9$-) is an example of a C$_{10}$ aliphatic radical.

As used herein, the term "abrasion resistance" refers to the resistance of a material to remain unimpaired by mechanical action, such as rubbing, scraping or erosion; impact; or pressure. The abrasion may result in loss in weight or a loss in gloss of the surface. The term abrasion resistance encompasses mar resistance and scratch resistance.

As noted, in one aspect the present invention provides a method for improving the abrasion resistance of a plastic article. The method comprises: (a) providing a composition comprising at least one e-beam active thermoplastic polymeric material; (b) forming an article from the composition of step (a); and (c) exposing the article formed in step (b) to an electron beam source.

As used herein, the term "e-beam active thermoplastic polymeric material" refers to a polymeric material capable of cross-linking to itself or another polymeric material upon exposure to an electron beam (e-beam) source. E-beam active thermoplastic polymeric material comprises e-beam active functional groups, which on exposure to an e-beam beam source generate free radicals. Without being bound by any theory, it is believed that the e-beam active functional groups may generate stable free radicals upon exposure to an electron beam source. The thermoplastic polymeric material of the present invention may be made e-beam active by incorporating e-beam active functional groups as part of the main-chain, as pendent groups or as end-caps.

As used herein, the term "thermoplastic polymeric material" refers to a material with a macromolecular structure that will repeatedly soften when heated and harden when cooled. Illustrative examples of thermoplastic polymeric materials suitable for the method of the present invention include, but are not limited to, olefin-derived polymers, for example, polyethylene, polypropylene, and their copolymers; polymethylpentane-derived polymers, for example, polybutadiene, polyisoprene, and their copolymers; polymers of unsaturated carboxylic acids and their functional derivatives, for example, acrylic polymers such as poly(alkyl acrylates), poly(alkyl methacrylate), polyacrylamides, polyacrylonitrile, and polyacrylic acid; alkenylaromatic polymers, for example polystyrene, poly-alpha-methylstyrene, polyvinyltoluene, and rubber-modified polystyrenes; polyamides, for example, nylon-6, nylon-6,6, nylon-1,1, and nylon-1,2; polyesters, such as, poly(alkylene dicarboxylates), especially poly(ethylene terephthalate) (hereinafter sometimes designated "PET"), poly(1,4-butylene terephthalate) (hereinafter sometimes designated "PBT"), poly(trimethylene terephthalate) (hereinafter sometimes designated "PTT"), poly(ethylene naphthalate) (hereinafter sometimes designated "PEN"), poly(butylene naphthalate) (hereinafter sometimes designated "PBN"), poly(cyclohexanedimethanol terephthalate), poly(cyclohexanedimethanol-co-ethylene terephthalate) (hereinafter sometimes designated "PETG"), and poly(1,4-cyclohexanedimethyl-1,4-cyclohexanedicarboxylate) (hereinafter sometimes designated "PCCD"), and poly(alkylene arenedioates); polycarbonates; co-polycarbonates; co-polyestercarbonates; polysulfones; polyimides; polyarylene sulfides; polysulfide sulfones; and polyethers such as polyarylene ethers, polyphenylene ethers, polyethersulfones, polyetherimides, polyetherketones, polyetheretherketones; and copolymers thereof.

In one embodiment, the thermoplastic polymeric material is selected from the group consisting of polyesters such as PETs, PBTs, polysulfones, polyethersulfones, polyimides, polyetherimides, polyetherketones, polyetheretherketones, polyphenylene ethers, polycarbonates, co-polycarbonates, co-polyestercarbonates, and copolymers thereof. In an alternate embodiment, the thermoplastic polymer is selected from the group consisting of polycarbonates, co-polycarbonates, and co-polyestercarbonates.

Thus, in one embodiment, the present invention provides a method for improving the abrasion resistance of a plastic article comprising at least one of a polycarbonate, a co-polycarbonate, or a co-polyestercarbonate. The method comprises: (a) providing a composition comprising at least one e-beam active thermoplastic polymeric material selected from the group consisting of polycarbonates, co-polycarbonates, and co-polyestercarbonates; (b) forming an article from the composition of step (a); and (c) exposing the article formed in step (b) to an electron beam source.

In one embodiment, the e-beam active thermoplastic polymeric material comprises structural units of formula (I)

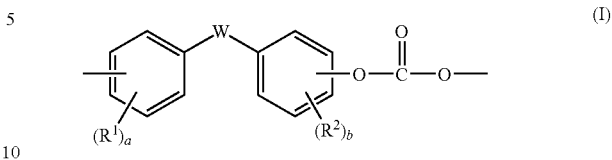

wherein $R^1$ and $R^2$ are independently at each occurrence a halogen atom, a nitro group, a cyano group, a $C_1$-$C_{20}$ aliphatic radical, a $C_3$-$C_{40}$ cycloaliphatic radical, or a $C_3$-$C_{40}$ aromatic radical; W is a $C_1$-$C_{20}$ aliphatic radical, a $C_3$-$C_{40}$ cycloaliphatic radical, or a $C_3$-$C_{40}$ aromatic radical; and "a" and "b" are independently at each occurrence an integer from 0 to 4, with the proviso that at least one of W, $R^1$ and $R^2$ comprises at least one electron-beam active functional group.

As noted, an e-beam active functional group generates free radicals on exposure to an electron beam source and facilitates crosslinking. In one embodiment, the e-beam active functional group comprises primary, secondary or tertiary aliphatic or cycloaliphatic radicals. In an alternate embodiment, the e-beam active functional group comprises secondary or tertiary aliphatic or cycloaliphatic radicals. In an alternate embodiment, the e-beam active functional group comprises aromatic radicals, especially benzyl radicals. Without being bound by any theory, it is believed that the secondary or tertiary aliphatic or cycloaliphatic radicals may generate stable free radicals on exposure to an electron beam source.

Methods for preparation of polycarbonates and co-polycarbonates include, but are not limited to, interfacial polymerization using for example phosgene; bischloroformate polymerization method using for example bisphenol bischloroformate; and melt polymerization method using for example a bisphenol and a diaryl carbonate, such as diphenyl carbonate. The polymerization of the reactants may be facilitated by use of a tertiary amine catalyst or a phase transfer catalyst.

In one embodiment, structural units of formula (I) are derived from their corresponding bisphenols. Representative examples of bisphenols that the structural units of formula (I) may be derived from include, but are not limited to, 2,2-bis(4-hydroxy-3-methyl)propane (hereinafter at times referred to as DMBPA); 4,4'-(1-phenylethylidene)-bis(2-methyphenol) (hereinafter at times referred to as DMbisAP); 1,1-bis(4-hydroxy-3-methylphenyl)cyclohexane (hereinafter at times referred to as DMBPC); 1,1-bis(4-hydroxy-3-methylphenyl)cyclopentane; 1,1-bis(4-hydroxy-3-methylphenyl)cycloheptane; 1,1-bis(4-hydroxy-3-methylphenyl)-3,3,5-trimethylcyclohexane (hereinafter at times referred to as DMBPI); 4,4'-[1-methyl-4-(1-methylethyl)-1,3-cyclohexandiyl]bisphenol (hereinafter at times referred to as BHPM); and their mixtures thereof.

In one embodiment, the e-beam active thermoplastic polymeric material is a homo polycarbonate and comprises structural units of formula (I) derived from the same bisphenol. Thus by way of example, in one embodiment the e-beam active polycarbonate may be derived from DMBPC and may be prepared by introducing phosgene under interfacial conditions to DMBPC.

In one embodiment, the e-beam active thermoplastic polymeric material is a co-polycarbonate comprising at least one structural unit of formula (I). In one embodiment, the e-beam active co-polycarbonate comprises more than one structural units of formula (I) derived from their corresponding bisphenols. Thus, by way of example, in one embodiment, the e-beam active co-polycarbonate may be derived from DMBPC and DMBPI and may be prepared by introducing phosgene under interfacial conditions to a mixture of DMBPC and DMBPI.

In another embodiment, the e-beam active co-polycarbonate comprises one or more structural units of formula (I) derived from their corresponding bisphenols and one or more structural units derived from other glycols or phenols. Thus, by way of example, in one embodiment, the e-beam active co-polycarbonate may be derived from DMBPC and 2,2'-bis(4-hydroxy)propane (hereinafter at times referred to as BPA) and may be prepared by introducing phosgene under interfacial conditions to a mixture of DMBPC and BPA.

In one embodiment, the e-beam active thermoplastic polymeric material is a co-polycarbonate comprising structural units of formula (II);

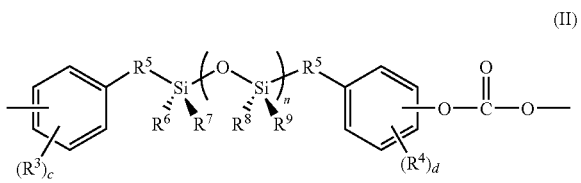

wherein $R^3$ and $R^4$ are independently at each occurrence a halogen atom, a nitro group, a cyano group, a $C_1$-$C_{20}$ aliphatic radical, a $C_3$-$C_{40}$ cycloaliphatic radical, or a $C_3$-$C_{40}$ aromatic radical; $R^5$ is independently at each occurrence a $C_2$-$C_{10}$ aliphatic radical or an oxygen atom; $R^6$, $R^7$, $R^8$ and $R^9$ are independently at each occurrence a hydrogen atom, a $C_1$-$C_{20}$ aliphatic radical, a $C_3$-$C_{40}$ cycloaliphatic radical, or a $C_3$-$C_{40}$ aromatic radical; "c" and "d" are independently at each occurrence an integer from 0 to 4; and "n" is an integer from 0 to 10.

Co-polycarbonates comprising structural units of formula (II) may be prepared by a variety of methods such as interfacial polymerization, melt polymerization and solid-state polymerization. Thus, by way of example, in one embodiment the co-polycarbonate may be prepared by introducing phosgene under interfacial reaction conditions into a mixture of a dihydric aromatic compound, such as BPA and a hydroxyaryl-terminated polyorganosiloxane.

The hydroxyaryl-terminated polyorganosiloxane may be prepared by hydrosilylation of an aliphatically unsaturated phenol with a siloxane dihydride in the presence of a catalyst. Representative examples of aliphatically unsaturated phenols include, but are not limited to, 4-allyl-2-methoxy phenol (herein after referred to as eugenol); 2-alkylphenol, 4-allyl-2-methylphenol; 4-allyl-2-phenylphenol; 4-allyl-2-bromophenol; 4-allyl-2-t-butoxyphenol; 4-phenyl-2-phenylphenol; 2-methyl-4-propylphenol; 2-allyl-4,6-dimethylphenol; 2-allyl-4-bromo-6-methylphenol; 2-allyl-6-methoxy-4-methylphenol and 2-allyl-4,6-dimethylphenol. Mixtures of aliphatically unsaturated monohydric phenols may also be used.

Representative examples of co-polycarbonates comprising structural units of formula (II) include, but are not limited to, structures of formulae (III), (IV) or (V), wherein "n" is as previously defined.

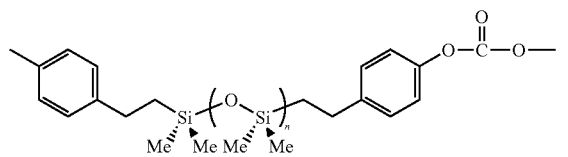

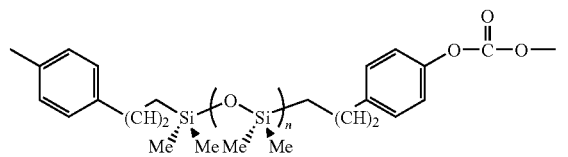

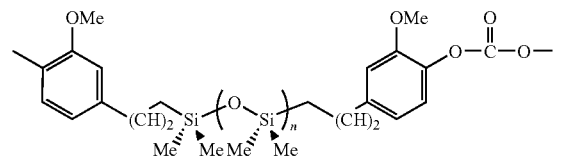

In one embodiment, the electron-beam active polymeric material is a co-polyestercarbonate comprising at least one polycarbonate block and at least one polyester block. In another embodiment, the thermoplastic polymeric material comprises a co-polyestercarbonate comprising a polyester block comprising structural units having formula (VI);

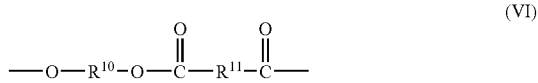

wherein $R^{10}$ are $R^{11}$ are independently at each occurrence a divalent $C_2$-$C_{20}$ aliphatic radical, a divalent $C_3$-$C_{40}$ aromatic radical, a divalent $C_3$-$C_{40}$ cycloaliphatic radical, or comprises structural units of formula (VII),

wherein $R^{12}$ and $R^{13}$ are independently at each occurrence a hydrogen atom, a $C_1$-$C_{20}$ aliphatic radical, a $C_3$-$C_{40}$ cycloaliphatic radical, or a $C_3$-$C_{40}$ aromatic radical and "p" is an integer from 1 to 10; with the proviso that at least one of $R^{10}$ and $R^{11}$ comprises at least one electron-beam active functional group.

The structural units of formula (VI) may be derived from a diol of formula (VII) and diacid or diacid derivatives of formula (VIII):

wherein $R^{10}$ and $R^{11}$ are as previously defined and $R^{12}$ is independently at each occurrence a hydroxyl, a halogen, a $C_1$-$C_{20}$ alkoxy group, or a $C_3$-$C_{20}$ aryloxy group.

Suitable diols encompassed within formula (VI) include, but are not limited to, ethylene glycol; propylene glycol, i.e., 1,2- and 1,3-propylene glycol; 2,2-dimethyl-1,3-propane diol; 2-ethyl-2-methyl-1,3-propane diol; 1,3- and 1,5-pentane diol; dipropylene glycol; 2-methyl-1,5-pentane diol; 1,6-hexane diol; dimethanol decalin, dimethanol bicyclo octane; 1,4-cyclohexane dimethanol and particularly its cis- and trans-isomers; 2,2,4,4-tetramethyl-1,3-cyclobutanediol (TMCBD); triethylene glycol; 1,10-decane diol; polyols such as polyethylene glycols or polybutylene glycols, and mixtures of any of the foregoing.

Suitable diacids and diacid derivatives, for example diacids, diacid halides, diesters and acid esters, encompassed within formula (VIII) include, but are not limited to decanedioic acid, undecanedioic acid, dodecanedioic acid, sebacic acid, adipic acid, suberic acid, oleic acid, azelaic acid, erucaic acid, brazzylic acid, isophthalic acid, terephthalic acid, malonic acid, malic acid, maleic acid, lactic acid, naphthalene-2,7-dicarboxylic acid, cyclohexane-1,4-dicarboxylic acid, decahydro naphthalene dicarboxylic acid, norbornene dicarboxylic acid, bicyclo octane dicarboxylic acid, biphenyl-3,4'-dicarboxylic acid, biphenyl-4,4'-dicarboxylic acid, diphenylether-4,4'-dicarboxylic acid, diphenylsulfone-4,4'-dicarboxylic acid, diphenylketone-4,4'-dicarboxylic acid, diphenylsulfide-4,4'-dicarboxylic acid, diphenylmethane-4,4'-dicarboxylic acid, diphenyldichloromethane-4,4'-dicarboxylic acid, their corresponding diacid halides, diesters or acid esters and mixtures thereof.

The co-polyestercarbonates of the present invention and the methods for their preparation are well known in the art. In one embodiment, the co-polyestercarbonate comprises a polyester block comprising structural units represented by formula (VI), which are derived from aliphatic diols or aliphatic diacids or diacid derivatives. LEXAN SP is one example of such a co-polyestercarbonate incorporating structural units derived from bisphenol A and dodecanedioic acid. LEXAN SP is available commercially from GE Plastics, Pittsfield, Mass.

In one embodiment, $R^{10}$ of formula (VI) is selected from the group consisting of a hexanediol residue, a butanediol residue, an oligoethylene glycol residue, an oligopropylene glycol residue, an oligobutylene glycol residue, and a combination thereof. In one embodiment, $R^{11}$ of formula (VI) is selected from the group consisting of an isophthalic acid residue, a terephthalic acid residue and a combination thereof. Representative examples of co-polyestercarbonates comprising structural units of formula (VI) include, but are not limited to, structures of formulae (IX), (X) and (XI).

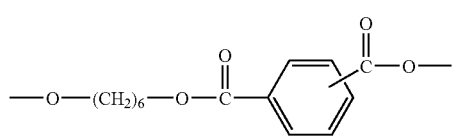
(IX)

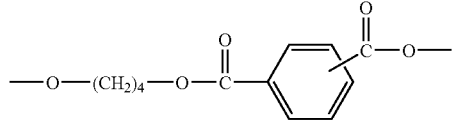
(X)

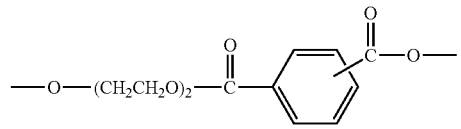
(XI)

In one embodiment, the electron-beam active polymeric material comprises at least one terminally connected moiety comprising structural units of formula (XII);

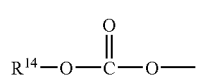
(XII)

wherein $R^{14}$ is a $C_1$-$C_{20}$ aliphatic radical, a $C_3$-$C_{40}$ cycloaliphatic radical, a $C_3$-$C_{40}$ aromatic radical, or comprises structural units of formula (XIII),

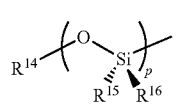
(XIII)

wherein $R^{14}$, $R^{15}$ and $R^{16}$ are independently at each occurrence a hydrogen atom, a $C_1$-$C_{20}$ aliphatic radical, a $C_3$-$C_{40}$ cycloaliphatic radical, or a $C_3$-$C_{40}$ aromatic radical; and "p" is an integer from 1 to 10.

Terminally connected moieties comprising structural units of formula (XI) may be introduced in the thermoplastic polymeric material by using mono-alcohols especially mono phenols, monoacid chlorides, mono-chloroformates, and combinations thereof. Suitable mono-phenolic compounds include monocyclic phenols, such as $C_1$-$C_{22}$ alkyl-substituted phenols, p-cumyl-phenol, p-tertiary-butyl phenol, and monoethers of diphenols, such as p-methoxyphenol. Suitable mono-carboxylic acid chlorides include monocyclic, mono-carboxylic acid chlorides, such as $C_1$-$C_{22}$ alkyl-substituted benzoyl chloride or toluoyl chloride. Suitable mono-chloroformates include monocyclic, mono-chloroformates, alkyl-substituted phenyl chloroformate, p-cumyl phenyl chloroformate, toluene chloroformate, and mixtures thereof. In one embodiment, the terminally connected moiety comprises structural units derived from p-cumyl phenol.

In one embodiment, the e-beam active thermoplastic material of the present invention may further comprise structural units of formula (XIV);

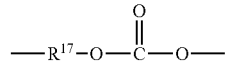
(XIV)

wherein $R^{17}$ is a divalent $C_2$-$C_{20}$ aliphatic radical, a divalent $C_3$-$C_{40}$ aromatic radical, or a divalent $C_3$-$C_{40}$ cycloaliphatic radical. In some embodiments, $R^{16}$ may be derived from a dihydroxy aliphatic compound, a dihydroxy cycloaliphatic compound or a dihydroxy aromatic compound.

Structural units of formula (XIV) may be present in the-beam active co-polycarbonates or co-polyestercarbonates of the present invention. Structural units of formula (XIV) may be incorporated in an e-beam active co-polycarbonate, by reacting a dihydroxy aliphatic, a dihydroxy cycloaliphatic or a dihydroxy aromatic compound with one or more of bisphenols corresponding to structural units of formula (I) or formula (II). In one embodiment, the e-beam active thermoplastic material is a co-polycarbonate comprising BPA structural units and structural units corresponding to formula (I) or formula (II).

Structural units of formula (XIV) may also be incorporated in an e-beam active co-polyestercarbonate by reacting a dihydroxy aliphatic, a dihydroxy cycloaliphatic or a dihydroxy aromatic compound with one or more of dihydroxy-terminated polyester intermediates corresponding to structural units of formula (VI). In one embodiment, the e-beam active thermoplastic material is a co-polyestercarbonate comprising BPA structural units and structural units corresponding to formula (VI).

In one embodiment, $R^{17}$ of formula (XIV) is a divalent $C_3$-$C_{40}$ aromatic radical derived from a dihydroxy aromatic compound having formula (XV);

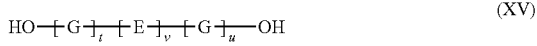
(XV)

wherein each G is independently at each occurrence a $C_3$-$C_{40}$ aromatic radical; E is independently at each occurrence a bond, a $C_1$-$C_{20}$ aliphatic radical, a $C_3$-$C_{40}$ cycloaliphatic radical, a $C_3$-$C_{40}$ aromatic radical, a sulfur-containing linkage, a selenium-containing linkage, a phosphorus-containing linkage, or an oxygen atom; "t" is a number greater than or equal to one; "v" is either zero or one; and "u" is a whole number including zero.

In certain embodiments, the dihydroxy aromatic compound is selected from the group consisting of 1,1-bis(4-hydroxyphenyl)cyclopentane; 2,2-bis(3-allyl-4-hydroxyphenyl)propane; 2,2-bis(2-t-butyl-4-hydroxy-5-methylphenyl)propane; 2,2-bis(3-t-butyl-4-hydroxy-6-methylphenyl)propane; 2,2-bis(3-t-butyl-4-hydroxy-6-methylphenyl)butane; 1,3-bis[4-hydroxyphenyl-1-(1-methylethylidine)]benzene; 1,4-bis[4-hydroxyphenyl-1-(1-methylethylidine)]benzene; 1,3-bis[3-t-butyl-4-hydroxy-6-methylphenyl-1-(1-methylethylidine)]benzene; 1,4-bis[3-t-butyl-4-hydroxy-6-methylphenyl-1-(1-methylethylidine)]benzene; 4,4'-biphenol; 2,2',6,8-tetramethyl-3,3',5,5'-tetrabromo-4,4'-biphenol; 2,2',6,6'-tetramethyl-3,3',5-tribromo-4,4'-biphenol; 1,1-bis(4-hydroxyphenyl)-2,2,2-trichloroethane; 2,2-bis(4-hydroxyphenyl-1,1,1,3,3,3-hexafluoropropane); 1,1-bis(4-hydroxyphenyl)-1-cyanoethane; 1,1-bis(4-hydroxyphenyl)dicyanomethane; 1,1-bis(4-hydroxyphenyl)-1-cyano-1-phenylmethane; 2,2-bis(3-methyl-4-hydroxyphenyl)propane; 1,1-bis(4-hydroxyphenyl)norbornane; 9,9-bis(4-hydroxyphenyl)fluorene; 3,3-bis(4-hydroxyphenyl)phthalide; 1,2-bis(4-hydroxyphenyl)ethane; 1,3-bis(4-hydroxyphenyl)propenone; bis(4-hydroxyphenyl) sulfide; 4,4'-oxydiphenol; 4,4-bis(4-hydroxyphenyl)pentanoic acid; 4,4-bis(3,5-dimethyl-4-hydroxyphenyl)pentanoic acid; 2,2-bis(4-hydroxyphenyl) acetic acid; 2,4'-dihydroxydiphenylmethane; 2-bis(2-hydroxyphenyl)methane; bis(4-hydroxyphenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 1,1-bis(4-hydroxy-2-chlorophenyl)ethane; 2,2-bis(4-hydroxyphenyl)propane (bisphenol-A); 1,1-bis(4-hydroxyphenyl)propane; 2,2-bis(3-chloro-4-hydroxyphenyl)propane; 2,2-bis(3-bromo-4-hydroxyphenyl)propane; 2,2-bis(4-hydroxy-3-methylphenyl)propane; 2,2-bis(4-hydroxy-3-isopropylphenyl)propane; 2,2-bis(3-t-butyl-4-hydroxyphenyl)propane; 2,2-bis(3-phenyl-4-hydroxyphenyl)propane; 2,2-bis(3,5-dichloro-4-hydroxyphenyl)propane; 2,2-bis(3,5-dibromo-4-hydroxyphenyl)propane; 2,2-bis(3,5-dimethyl-4-hydroxyphenyl)propane; 2,2-bis(3-chloro-4-hydroxy-5-methylphenyl)propane; 2,2-bis(3-bromo-4-hydroxy-5-methylphenyl)propane; 2,2-bis(3-chloro-4-hydroxy-5-isopropylphenyl)propane; 2,2-bis(3-bromo-4-hydroxy-5-isopropylphenyl)propane; 2,2-bis(3-t-butyl-5-chloro-4-hydroxyphenyl)propane; 2,2-bis(3-bromo-5-t-butyl-4-hydroxyphenyl)propane; 2,2-bis(3-chloro-5-phenyl-4-hydroxyphenyl)propane; 2,2-bis(3-bromo-5-phenyl-4-hydroxyphenyl)propane; 2,2-bis(3,5-disopropyl-4-hydroxyphenyl)propane; 2,2-bis(3,5-di-t-butyl-4-hydroxyphenyl)propane; 2,2-bis(3,5-diphenyl-4-hydroxyphenyl)propane; 2,2-bis(4-hydroxy-2,3,5,6-tetrachlorophenyl)propane; 2,2-bis(4-hydroxy-2,3,5,6-tetrabromophenyl)propane; 2,2-bis(4-hydroxy-2,3,5,6-tetramethylphenyl)propane; 2,2-bis(2,6-dichloro-3,5-dimethyl-4-hydroxyphenyl)propane; 2,2-bis(2,6-dibromo-3,5-dimethyl-4-hydroxyphenyl)propane; 2,2-bis(4-hydroxy-3-ethylphenyl)propane; 2,2-bis(4-hydroxy-3,5-dimethylphenyl)propane; 2,2-bis(3,5,3',5'-tetrachloro-4,4'-dihydroxyphenyl)propane; 1,1-bis(4-hydroxyphenyl) cyclohexylmethane; 2,2-bis(4-hydroxyphenyl)-1-phenylpropane; 1,1-bis(4-hydroxyphenyl)cyclohexane; 1,1-bis(3-chloro-4-hydroxyphenyl)cyclohexane; 1,1-bis(3-bromo-4-hydroxyphenyl)cyclohexane; 1,1-bis(4-hydroxy-3-methylphenyl)cyclohexane; 1,1-bis(4-hydroxy-3-isopropylphenyl)cyclohexane; 1,1-bis(3-t-butyl-4-hydroxyphenyl)cyclohexane; 1,1-bis(3-phenyl-4-hydroxyphenyl)cyclohexane; 1,1-bis(3,5-dichloro-4-hydroxyphenyl)cyclohexane; 1,1-bis(3,5-dibromo-4-hydroxyphenyl)cyclohexane; 1,1-bis(3,5-dimethyl-4-hydroxyphenyl)cyclohexane; 4,4'-[1-methyl-4-(1-methylethyl)-1,3-cyclohexandiyl]bisphenol (1,3 BHPM); 4-[1-[3-(4-hydroxyphenyl)-4-methylcyclohexyl]-1-methyl-ethyl]-phenol (2,8 BHPM); 3,8-dihydroxy-5a,10b-diphenylcoumarano-2',3',2,3-coumarane (DCBP); 2-phenyl-3,3-bis(4-hydroxyphenyl)phthalimidine; 1,1-bis(3-chloro-4-hydroxy-5-methylphenyl)cyclohexane; 1,1-bis(3-bromo-4-hydroxy-5-methylphenyl)cyclohexane; 1,1-bis(3-chloro-4-hydroxy-5-isopropylphenyl)cyclohexane; 1,1-bis(3-bromo-4-hydroxy-5-isopropylphenyl)cyclohexane; 1,1-bis(3-t-butyl-5-chloro-4-hydroxyphenyl)cyclohexane; 1,1-bis(3-bromo-5-t-butyl-4-hydroxyphenyl)cyclohexane; 1,1-bis(3-chloro-5-phenyl-4-hydroxyphenyl)cyclohexane; 1,1-bis(3-bromo-5-phenyl-4-hydroxyphenyl)cyclohexane; 1,1-bis(3,5-disopropyl-4-hydroxyphenyl)cyclohexane; 1,1-bis(3,5-di-t-butyl-4-hydroxyphenyl)cyclohexane; 1,1-bis(3,5-diphenyl-4-hydroxyphenyl)cyclohexane; 1,1-bis(4-hydroxy-2,3,5,6-tetrachlorophenyl)cyclohexane; 1,1-bis(4-hydroxy-2,3,5,6-tetrabromophenyl)cyclohexane; 1,1-bis(4-hydroxy-2,3,5,6-tetramethylphenyl)cyclohexane; 1,1-bis(2,6-dichloro-3,5-dimethyl-4-hydroxyphenyl)cyclohexane; 1,1-bis(2,6-dibromo-3,5-dimethyl-4-hydroxyphenyl) cyclohexane; 1,1-bis(4-hydroxyphenyl)-3,3,5-trimethylcyclohexane; 1,1-bis(3-chloro-4-hydroxyphenyl)-3,3,5-trimethylcyclohexane; 1,1-bis(3-bromo-4-hydroxyphenyl)-3,3,5-trimethylcyclohexane; 1,1-bis(4-hydroxy-3-methylphenyl)-3,3,5-trimethylcyclohexane; 1,1-bis(4-hydroxy-3-isopropylphenyl)-3,3,5-trimethylcyclohexane; 1,1-bis(3-t-butyl-4-hydroxyphenyl)-3,3,5-trimethylcyclohexane; 1,1-bis(3-phenyl-4-hydroxyphenyl)-3,3,5-trimethylcyclohexane; 1,1-bis(3,5-dichloro-4-hydroxyphenyl)-3,3,5-trimethylcyclohexane; 1,1-bis(3,5-dibromo-4-hydroxyphenyl)-3,3,5-trimethylcyclohexane; 1,1-bis(3,5-dimethyl-4-hydroxyphenyl)-3,3,5-trimethylcyclohexane; 1,1-bis(3-chloro-4-hydroxy-5-methylphenyl)-3,3,5-trimethylcyclohexane; 1,1-bis(3-bromo-4-hydroxy-5-methylphenyl)-3,3,5-trimethylcyclohexane; 1,1-bis(3-chloro-4-hydroxy-5-isopropylphenyl)-3,3,5-trimethylcyclohexane; 1,1-bis(3-bromo-4-hydroxy-5-isopropylphenyl)-3,3,5-trimethylcyclohexane; 1,1-bis(3-t-butyl-5-chloro-4-hydroxyphenyl)-3,3,5-trimethylcyclohexane; 1,1-bis(3-bromo-5-t-butyl-4-hydroxyphenyl)-3,3,5-trimethylcyclohexane; bis(3-chloro-5-phenyl-4-hydroxyphenyl)-3,3,5-trimethylcyclohexane; 1,1-bis(3-bromo-5-phenyl-4-hydroxyphenyl)-3,3,5-trimethylcyclohexane; 1,1-bis(3,5-disopropyl-4-hydroxyphenyl)-3,3,5-trimethylcyclohexane; 1,1-bis(3,5-di-t-butyl-4-hydroxyphenyl)-3,3,5-trimethylcyclohexane; 1,1-bis(3,5-diphenyl-4-hydroxyphenyl)-3,3,5-trimethylcyclohexane; 1,1-bis(4-hydroxy-2,3,5,6-tetrachlorophenyl)-3,3,5-trimethylcyclohexane; 1,1-bis(4-hydroxy-2,3,5,6-tetrabromophenyl)-3,3,5-trimethylcyclohexane; 1,1-bis(4-hydroxy-2,3,5,6-tetramethylphenyl)-3,3,5-trimethylcyclohexane; 1,1-bis(2,6-dichloro-3,5-dimethyl-4-hydroxyphenyl)-3,3,5-trimethylcyclohexane; 1,1-bis(2,6-dibromo-3,5-dimethyl-4-hydroxyphenyl)-3,3,5-trimethylcyclohexane; 4,4-bis(4-hydroxyphenyl)heptane; 1,1-bis(4-hydroxyphenyl)decane; 1,1-bis(4-hydroxyphenyl)cyclododecane; 1,1-bis(3,5-dimethyl-4-hydroxyphenyl)cyclododecane; 4,4'dihydroxy-1,1-biphenyl; 4,4'-dihydroxy-3,3'-dimethyl-1,1-biphenyl; 4,4'-dihydroxy-3,3'-dioctyl-1,1-biphenyl; 4,4'-(3,3,5-trimethylcyclohexylidene)diphenol; 4,4'-bis(3,5-dimethyl)diphenol; 4,4'-dihydroxydiphenylether; 4,4'-dihydroxydiphenylthioether; 1,3-bis(2-(4-hydroxyphenyl)-2-propyl)benzene; 1,3-bis(2-(4-hydroxy-3-methylphenyl)-2-propyl)benzene; 1,4-bis(2-(4-hydroxyphenyl)-2-propyl)benzene; 1,4-bis(2-(4-hydroxy-3-methylphenyl)-2-propyl)benzene; 2,4'-dihydroxyphenyl sulfone; 4,4'-dihydroxydiphenylsulfone (BPS); bis(4-hydroxyphenyl)methane; 2,6-dihydroxy naphthalene; hydroquinone; resorcinol; $C_{1-3}$ alkyl-substituted resorcinols; 3-(4-hydroxyphenyl)-1,1,3-trimethylindan-5-ol; 1-(4-hydroxyphenyl)-1,3,3-trimethylindan-5-ol; 4,4-dihydroxydiphenyl ether; 4,4-dihydroxy-3,3-dichlorodiphenylether; 4,4-dihydroxy-2,5-dihydroxydiphenyl ether; 4,4-thiodiphenol; 2,2,2',2'-tetrahydro-3,3,3',3'-tetramethyl-1,1'-spirobi[1H-indene]-6,6'-diol; and mixtures thereof. Dihydroxy aromatic compounds of formula (XVI) are commercially available or may be prepared by methods known to those skilled in the art.

In one embodiment, $R^{17}$ of formula (XIV) is derived from bisphenol A (2,2-bis(4-hydroxyphenyl)propane, CAS No. 80-05-7) and the e-beam active thermoplastic polymeric material comprises Bisphenol A polycarbonate structural units. Bisphenol A is available commercially from ALDRICH Chemical Co.

In one embodiment, the e-beam active thermoplastic material of the present invention may further comprise polyester structural units of formula (XV);

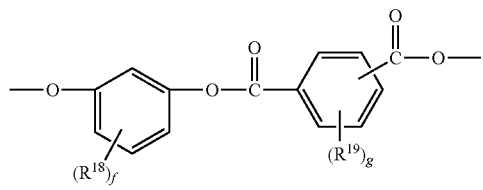

(XV)

wherein $R^{18}$ and $R^{19}$ are independently at each occurrence a halogen atom, a nitro group, a cyano group, a $C_1$-$C_{20}$ aliphatic radical, a $C_3$-$C_{40}$ cycloaliphatic radical, or a $C_3$-$C_{40}$ aromatic radical; and "f" and "g" are independently at each occurrence an integer from 0 to 4. For convenience, polyesters comprising resorcinol moieties and iso- and terephthalate moieties of formula (XV) are referred to as "ITR polymers", or simply "ITR's". In one embodiment, subscripts "f" and "g" of formula (XV) are both 0 and such polyesters are referred to as "unsubstituted ITR's".

Structural units of formula (XV) may be present in the e-beam active co-polyestercarbonates of the present invention. In one embodiment, structural units of formula (XV) may be incorporated in the e-beam active co-polyestercarbonates, by reacting a dihydroxy-terminated polyester intermediate corresponding to structural units of formula (XV) with one or more bisphenols corresponding to structural units of formula (I) or formula (II) and one or more diols having formula (XIV). In one embodiment, the e-beam active co-polyestercarbonate comprises BPA structural units, unsubstituted ITR structural units and structural units having formula (I) or (II).

In another embodiment, structural units of formula (XV) may be incorporated in the e-beam active co-polyestercarbonates, by reacting a dihydroxy-terminated polyester intermediate corresponding to structural units of formula (XV) with a dihydroxy-terminated polyester intermediate corresponding to structural units of formula (VI) and one or more diols having formula (XIV). In one embodiment, the e-beam active co-polyestercarbonate comprises BPA structural units, unsubstituted ITR structural units and structural units having formula (VI).

The dihydroxy-terminated polyester intermediates can be prepared by methods known to those skilled in the art. In one embodiment, the hydroxy-terminated polyester intermediate corresponding to structural units of formula (XV) is prepared by reacting a resorcinol with one or more isophthaloyl dichloride and terephthaloyl dichloride in a reaction mixture comprising water and at least one organic solvent substantially immiscible with water (i.e. under interfacial conditions). Control of the molecular weight of the hydroxy-terminated polyester may be exerted by increasing the molar ratio of the resorcinol to the diacid chloride employed, and by decreasing the amount of water present in the reaction mixture. Enhanced control of the molecular weight of the hydroxy-terminated polyester intermediate may thus be achieved with or without the use of an endcapping agent.

The composition comprising at least one e-beam active thermoplastic polymeric material may additionally contain additives known to those skilled in the art, including pigments, dyes, impact modifiers, UV screeners, flame retardants, fillers, stabilizers, flow aids, ester interchange inhibitors, and mold release agents The compositions of the present invention may be prepared or provided by mixing or blending an appropriate amount of an e-beam active thermoplastic polymeric material with any other additives. Methods of mixing or blending include, but are not limited to, melt mixing in a single screw or twin-screw extruder, mixing the components of the blend and composition as powders on a two-roll mill, in a Banbury mixer, in a paint shaker or in a coffee grinder.

In some embodiments, one or more components or additives can be added to the composition as an aqueous mixture or solution followed by devolatilization in appropriate processing equipment such as in an extruder. In another embodiment, some of the components may be mixed in aqueous solution and then evaporated to form a material which can be added to the remaining components In one embodiment, after blending, the composition may optionally be then reduced to a particulate form for example by pelletizing or grinding the composition. In one embodiment, the compositions of the present invention may be molded into useful shaped articles by a variety of means such as injection molding, extrusion, rotational molding, blow molding and thermoforming to form articles such as films or multilayered structures.

In one embodiment, the composition comprising at least one e-beam active thermoplastic polymeric material is extruded to form an article, which is a film. In one embodiment, the film has a thickness in a range from about 10 microns to about 1000 microns. In another embodiment, the film has a thickness in a range from about 100 microns to about 800 microns. In yet another embodiment, the film has a thickness in a range from about 200 microns to about 600 microns.

In one embodiment, a multilayer article is formed from the composition comprising at least one e-beam active thermoplastic polymeric material. The multilayer article comprises a substrate layer and a coating layer thereon. The substrate layer comprises a thermoplastic polymer, a thermoset polymer, cellulosic material, glass, ceramic, or metal. The coating layer comprises at least one e-beam active thermoplastic polymeric material selected from the group consisting of polycarbonates, co-polycarbonates, and co-polyestercarbonates. Optionally, the multilayer articles may further comprise an interlayer, for example an adhesive interlayer, between any substrate layer and any coating layer. Multilayer articles of the invention include, but are not limited to, those which comprise a substrate layer and a coating layer; those which comprise a substrate layer with a coating layer on each side of said substrate layer; and those which comprise a substrate layer and at least one coating layer with at least one interlayer between a substrate layer and a coating layer. The interlayer layer may be transparent and/or may contain an additive, for example a colorant or decorative material such as metal flake. The substrate layer, the coating layer, and any interlayers are preferably in contiguous superposed contact with one another.

The material of the substrate layer in the articles of this invention may be at least one second polymeric material, whether addition or condensation prepared. Suitable condensation polymers include, but are not limited to, polycarbonates, particularly aromatic polycarbonates, polyphenylene ethers, polyetherimides, polyesters, co-polyestercarbonates, and polyamides. In one embodiment, the substrate layer comprises at least one second polymeric material selected from the group consisting of polycarbonates, co-polycarbonates and co-polyestercarbonates. The second polymeric material is different from the e-beam active thermoplastic polymeric material.

Suitable polycarbonates (PC) and co-polycarbonates include structural units of formula (XVIII). The most preferred polycarbonates are bisphenol A homo- and co-polycarbonates. The polycarbonate substrate may also be a co-polyestercarbonate (other than that co-polyestercarbonate employed for the coating layer). Such copolymers typically comprise, in addition to the organic carbonate units, ester units such as isophthalate and/or terephthalate and may comprise structural units of formula (XIX). Polyester substrates include, but are not limited to, poly(ethylene terephthalate) (PET), poly(1,4-butylene terephthalate) (PBT), poly(trimethylene terephthalate), poly(ethylene naphthalate), poly(butylene naphthalate), poly(cyclohexanedimethanol terephthalate), poly(cyclohexanedimethanol-co-ethylene terephthalate), and poly(1,4-cyclohexanedimethyl-1,4-cyclohexanedicarboxylate).

Suitable addition polymer substrates include homo- and copolymeric aliphatic olefin and functionalized olefin polymers such as polyethylene, polypropylene, poly(vinyl chloride), poly(vinyl chloride-co-vinylidene chloride), poly(vinyl fluoride), poly(vinylidene fluoride), poly(vinyl acetate), poly(vinyl alcohol), poly(vinyl butyral), poly(acrylonitrile), acrylic polymers such as those of (meth)acrylamides or of alkyl(meth)acrylates such as poly(methyl methacrylate) ("PMMA"), and polymers of alkenylaromatic compounds such as polystyrenes, including syndiotactic polystyrene. The preferred addition polymers for many purposes are polystyrenes and especially the so-called ABS and ASA copolymers, which may contain thermoplastic, non-elastomeric styrene-acrylonitrile side chains grafted on an elastomeric base polymer of butadiene and alkyl acrylate, respectively.

Blends of any of the foregoing polymers may also be employed as substrates. Typical blends include, but are not limited to, those comprising PC/ABS, PC/ASA, PC/PBT, PC/PET, PC/polyetherimide, PC/polysulfone, polyester/polyetherimide, polymethyl methacrylate/acrylic rubber, polyphenylene ether/polystyrene, polyphenylene ether/polyamide or polyphenylene ether/polyester.

In one embodiment, the substrate layer in the multilayer article may comprise at least one of a thermoset polymer. Suitable thermoset polymer substrates include, but are not limited to, those derived from epoxys, cyanate esters, unsaturated polyesters, diallylphthalate, acrylics, alkyds, phenol-formaldehyde, novolacs, resoles, bismaleimides, PMR resins, melamine-formaldehyde, ureaformaldehyde, benzocyclobutanes, hydroxymethylfurans, and isocyanates. In one embodiment, the thermoset polymer substrate further comprises at least one thermoplastic polymer, such as, but not limited to, polyphenylene ether, polyphenylene sulfide, polysulfone, polyetherimide, or polyester. Said thermoplastic polymer is typically combined with thermoset monomer mixture before curing of said thermoset.

In one embodiment, a thermoplastic or thermoset substrate layer also incorporates at least one filler and/or pigment. Illustrative extending and reinforcing fillers, and pigments include silicates, zeolites, titanium dioxide, stone powder, glass fibers or spheres, carbon fibers, carbon black, graphite, calcium carbonate, talc, mica, lithopone, zinc oxide, zirconium silicate, iron oxides, diatomaceous earth, calcium carbonate, magnesium oxide, chromic oxide, zirconium oxide, aluminum oxide, crushed quartz, calcined clay, talc, kaolin, asbestos, cellulose, wood flour, cork, cotton and synthetic textile fibers, especially reinforcing fillers such as glass fibers and carbon fibers, as well as colorants such as metal flakes, glass flakes and beads, ceramic particles, other polymer particles, dyes and pigments which may be organic, inorganic or organometallic. In one embodiment, the invention encompasses multilayer articles comprising a filled thermoset substrate layer such as a sheet-molding compound (SMC).

The substrate layer may also comprise at least one cellulosic material including, but not limited to, wood, paper, cardboard, fiber board, particle board, plywood, construction paper, Kraft paper, cellulose nitrate, cellulose acetate butyrate, and like cellulosic-containing materials. The invention also encompasses blends of at least one cellulosic material and either at least one thermoset polymer (particularly an adhesive thermoset polymer), or at least one thermoplastic polymer (particularly a recycled thermoplastic polymer, such as PET or polycarbonate), or a mixture of at least one thermoset polymer and at least one thermoplastic polymer.

In one embodiment, the multilayer article comprises at least one glass layer as substrate layer. In one embodiment, the multilayer article comprises at least one metal layer as substrate layer. Representative metal substrates include those comprising brass, copper, and other metals or metal-containing articles, which might abrade.

Depending upon the nature of substrate and coating layers, at least one adhesive interlayer may be beneficially employed between any substrate layer and any coating layer. The adhesive interlayer may be transparent, opaque or translucent. For many applications it is preferred that the interlayer be optically transparent in nature and generally have a transmission of greater than about 60% and a haze value less than about 3% with no objectionable color.

In one embodiment, application of said coating layer comprises fabrication of a separate sheet thereof followed by application to the substrate layer, or by simultaneous production of both layers, typically in a melt process. Thus, there may be employed such methods as co-injection molding, coextrusion, overmolding, blow molding, multi-shot injection molding and placement of a film of the coating layer material on the surface of the substrate layer followed by adhesion of the two layers, typically in an injection molding apparatus; e.g., in-mold decoration, or in a hot-press. In one embodiment, application of the at least one coating layer may be performed by solvent-casting.

It is also within the scope of the invention to apply a structure comprising the coating layer and the substrate layer to a second substrate layer, which is generally of a thermoplastic, thermoset, or cellulosic material similar or identical to that of the substrate layer but different from that of the coating layer. This may be achieved, for example, by charging an injection mold with the structure comprising the coating layer and the substrate layer and injecting the second substrate material behind it. By this method, in-mold decoration and the like are possible. Both sides of the second substrate layer may receive the other layers, though it is usually preferred to apply them to only one side.

In one embodiment, the coating layer comprising the composition comprising an e-beam active thermoplastic polymeric material has a thickness in a range from about 10 microns to about 1000 microns. In another embodiment, the coating layer comprising the composition comprising a e-beam active thermoplastic polymeric material has a thickness in a range from about 100 microns to about 800 microns. In yet another embodiment, the coating layer comprising the composition comprising an e-beam active thermoplastic polymeric material has a thickness in a range from about 200 microns to about 600 microns.

In one embodiment, the substrate layer comprising the second polymeric material has a thickness in a range from about 10 microns to about 2000 microns. In another embodiment, the substrate layer comprising the second polymeric material has a thickness in a range from about 200 microns to about 1600 microns. In yet another embodiment, the substrate layer comprising the second polymeric material has a thickness in a range from about 400 microns to about 1000 microns.

As noted, an article comprising a composition comprising an e-beam active thermoplastic polymeric material is exposed to an electron beam (E-beam) source. Exposure to E-beam source introduces cross-links and/or chain scission and changes in polymer properties. The technique of exposure to E-beam source or E-beam irradiation is used in various applications such as television screens and is well-known to those of ordinary skill in the art. In one embodiment, E-beam irradiation comprises thermal emission of electrons from an electron emitting material such as tungsten; acceleration of the electrons emitted by application of voltage thereto; and focusing the beam by use of an electron field and/or transverse magnetic field. The E-beam irradiation may occur in ambient atmosphere conditions, in vacuum, or in an inert atmosphere. In one embodiment, the E-beam irradiation is conducted in the presence of nitrogen or hydrogen. In one embodiment, the E-beam irradiation is conducted in vacuum.

The acceleration voltage of the E-beam source determines the penetration depth of the E-beam. In one embodiment, the E-beam source has an operating voltage in the range from about 80 kV to about 20 MV. In another embodiment, the E-beam source has an operating voltage in the range from about 80 kV to about 1000 kV. In yet another embodiment, the E-beam source has an operating voltage in the range from about 80 kV to about 500 kV. In one particular embodiment, the electron beam source has an operating voltage of about 150 kV.

The change in properties of a plastic article upon exposure to E-beam radiation is determined by the E-bean dosage which is measured as energy per unit mass (e.g., 2.30 calories per gram equals one million rads, 1 Mrad). In one embodiment, exposure to an electron beam source results in an electron beam dosage in the range from about 1 Mrad to about 5000 Mrad. In another embodiment, exposure to an electron beam source results in an electron beam dosage in the range from about 1 Mrad to about 500 Mrad. In yet another embodiment, exposure to an electron beam source results in an electron beam dosage in the range from about 1 Mrad to about 200 Mrad.

In one embodiment, exposure to E-beam source results in change in one or more of glass transition temperatures, heat distortion temperatures, tensile strength/modulus, coefficient of thermal expansion, chemical resistance, or abrasion resistance.

In one embodiment, the present invention provides an article comprising an abrasion resistant surface. The article is prepared by a method comprising: (a) providing a composition comprising at least one e-beam active thermoplastic polymeric material selected from the group consisting of polycarbonates, co-polycarbonates, and copolyestercarbonates; (b) forming an article from the composition of step (a); and (c) exposing the article formed in step (b) to an electron beam source.

The articles which can be prepared by the method of the present invention include, automotive, truck, military vehicle, and motorcycle exterior and interior components, including panels, quarter panels, rocker panels, trim, fenders, doors, decklids, trunklids, hoods, bonnets, roofs, bumpers, fascia, grilles, mirror housings, pillar appliqués, cladding, body side moldings, wheel covers, hubcaps, door handles, spoilers, window frames, headlamp bezels, headlamps, tail lamps, tail lamp housings, tail lamp bezels, license plate enclosures, roof racks, and running boards; enclosures, housings, panels, and parts for outdoor vehicles and devices; enclosures for electrical and telecommunication devices; outdoor furniture; aircraft components; boats and marine equipment, including trim, enclosures, and housings; outboard motor housings; depth finder housings, personal water-craft; jet-skis; pools; spas; hot-tubs; steps; step coverings; building and construction applications such as glazing, roofs, windows, floors, decorative window furnishings or treatments; treated glass covers for pictures, paintings, posters, and like display items; wall panels, and doors; protected graphics; outdoor and indoor signs; enclosures, housings, panels, and parts for automatic teller machines (ATM); enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; articles made from plastic-wood combinations; golf course markers; utility pit covers; computer housings; desk-top computer housings; portable computer housings; lap-top computer housings; palm-held computer housings; monitor housings; printer housings; keyboards; FAX machine housings; copier housings; telephone housings; mobile phone housings; radio sender housings; radio receiver housings; light fixtures; lighting appliances; network interface device housings; transformer housings; air conditioner housings; cladding or seating for public transportation; cladding or seating for trains, subways, or buses; meter housings; antenna housings; cladding for satellite dishes; coated helmets and personal protective equipment; coated synthetic or natural textiles; coated photographic film and photographic prints; coated painted articles; coated dyed articles; coated fluorescent articles; coated foam articles; and like applications. The invention further contemplates additional fabrication operations on said articles, such as, but not limited to, molding, in-mold decoration, baking in a paint oven, lamination, and/or thermoforming.

While only certain features of the invention have been illustrated and described herein, many modifications and changes will occur to those skilled in the art. It is, therefore, to be understood that the appended claims are intended to cover all such modifications and changes as fall within the true spirit of the invention.

EXAMPLES

Materials: Bisphenol-A polycarbonate (BPA) and ITR-BPA (90/10) co-polyestercarbonate were used as comparative polymers and were commercially available from GE Plastics. The weight fraction of ITR block to the polycarbonate block in the ITR-PC copolymer equals to 90:10. Unless otherwise mentioned, the ITR-PC polymers were end-capped with phenol and were commercially available from GE Plastics. Experimental details for synthesis for synthesis of e-beam active co-polycarbonates and co-polyestercarbonates are provided in Examples 1-5.

In examples 1-5, the bisphenol A polycarbonate structural units are represented by BPA, the dimethyl bisphenol A polycarbonate structural units are represented by DMBPA, and the dimethyl bisphenol cyclohexanone structural units are represented by DMBPC. Arylate structural units comprising resorcinol-based moieties and iso- and terephthalate moieties are represented by ITR. Ester structural units comprising hexanediol-based moieties and iso- and terephthalate moieties are represented by ITR/HD. Ester structural units comprising diol-based moieties and iso- and terephthalate moieties are represented by ITR/HD. Ester structural units comprising diethyleneglycol-based moieties and iso- and terephthalate moieties are represented by ITR/DEG.

In Examples 1-5, the composition of the co-polycarbonates and co-polyestercarbonates is provided as weight fractions of the different structural units in the copolymers. Thus by way of example, a co-polyestercarbonate comprising 50 weight percent of ITR units and 50 weight percent of bisphenol A polycarbonate units is represented by ITR/BPA (50/50). The different structural units in the copolymers may be present as random or as blocks.

Example 1

Synthesis of DMBPC/BPA (50/50)

Dimethylbisphenol cyclohexanone (DMBPC) (14.8 g, 50 mmol), bisphenol-A (BPA) (11.4 g, 50 mmol), 125 mL methylene chloride and 90 mL of water were placed in a 500 mL Morton flask. The pH was adjusted to 11 with 50 wt % NaOH. Phosgene was added at 0.6 g/min, at 10.0 g (100 mmol), p-cumylphenol (1.48 g, 7 mol %) was added and phosgene was continued until 12.3 g (20 mol % excess) added. The pH was lowered to 10.5 (with phosgene) at which point 25 uL of triethylamine (TEA) added followed 5 min later with 25 uL more TEA. An additional 75 uL of TEA was added (125 uL total, about 1 mol %) followed by 4.5 g more phosgene. The reaction mixture was tested for chloroformates. If present they were hydrolyzed by addition of dimethylbutylamine (DMBA, 5 uL). The resulting solution was separated from the brine, washed with aqueous HCl, washed with water and steam crumbed in a blender. $T_g$ of the resulting polymer was 140° C. and Mw=27,700 grams per mole.

Example 2

Synthesis of ITR/DMBPA/BPA (90/5/5)

Into a 500 ml Morton flask equipped with a mechanical stirrer, a reflux condenser, a nitrogen bypass, a pH probe and a phosgene dip tube was placed 6.88 g of resorcinol, 100 ml of methylene chloride, 20 ml of water and 0.5 ml of 75 wt % aqueous methyltributylammonium (MTBA). The pH was adjusted to and maintained at 7 with 25 wt % of NaOH as 29 g of a 35 wt % solution of diacid chlorides (DACS) in methylene chloride (delivers 50 mmol of 50/50 isophthaloyl chloride (IPC)/terephthaloyl chloride (TPC)) was added over 4 minutes. The pH was raised to 10 and 100 μl of triethylamine (TEA), 50 mg of water and 0.21 g of phenol were added. The pH was maintained at 10 and 4.0 g of phosgene was added at 0.5 g/min. The final pH was 10.1. The polymer solution was separated from the brine by centrifugation and washed 1 time with 1N HCl and 3 times with deionized water. The polymer was isolated by hot water crumbing in a blender and collected by filtration and washed with water and dried in a vacuum oven at 110° C. overnight.

Example 3

Synthesis of ITR/HD/BPA (86/5/9)

To a reaction vessel charged with diacid chlorides (DACS, 2 eq., 638.63 g as a 35 wt % $CH_2Cl_2$ solution, delivers 50 mmol of 50/50 IPC/TPC), TEA (2 eq., 111.31 g, 1.1 mol, 153.32 ml) and 4-dimethylaminopyridien (DMA) (catalytic amount) in methylene chloride (5 L) was added a solution of 1,6-hexanediol (HD) (65 g, 0.55 mol) in methylene chloride (0.5 L) in a small portion. After 30 minutes, resorcinol (1150.65 g, 10.45 mol), water (2 L), methylene chloride (7 L) and phenol (26.35 g, 0.28 mol) were added followed by slow addition of DACS (5167.09 g as a 35 wt % $CH_2Cl_2$ solution, 8.9 mol) while maintaining a pH ~6.5 using 25 wt % aq. NaOH. Following which, the remaining base was added to reach pH ~7.5. The resulting mixture was stirred for additional 30 minutes before addition of BPA (250.8 g, 1.1 mol) and methyltributylammonium (MTBA, 50 mL), followed by phosgene (301.65 g, 3.05 mol) while maintaining a pH ~10 using 25 wt % aq. NaOH. The resulting polymer was isolated by hot water crumbing in a blender and collected by filtration and washed with water and dried in a vacuum oven at 110° C. overnight.

Example 4

Synthesis of ITR/BD/BPA (86/5/9)

To a reaction vessel charged with DACS (2 eq., 638.63 g as a 35 wt % CH2C12 solution, (delivers 50 mmol of 50/50

IPC/TPC), TEA (2 eq., 111.31 g, 1.1 mol, 153.32 ml) and 4-dimethylaminopyridien (DMA) (catalytic amount) in methylene chloride (5 L) was added a solution of 1,4-butanediol (BD)(49.6 g, 0.55 mol) in methylene chloride (0.5 L) in a small portion. After 30 minutes, resorcinol (1150.65 g, 10.45 mol), H2O (2 L), methylene chloride (7 L) and phenol (26.35 g, 0.28 mol) were added followed by slow addition of DACS (5167.09 g as a 35 wt % CH2Cl2 solution, 8.9 mol) while maintaining a pH ~6.5 using 25 wt % aq. NaOH and tapered in the remaining base to reach pH ~7.5. The mixture was kept stirred for additional 30 minutes, hr before addition of BPA (250.8 g, 1.1 mol) and MTBA (50 mL), followed by phosgene (301.65 g, 3.05 mol) while maintaining a pH ~10 using 25 wt % aq. NaOH. The polymer was isolated by hot water crumbing in a blender and collected by filtration and washed with water and dried in a vacuum oven at 110° C. overnight.

Example 5

Synthesis of ITR/DEG/BPA (86/5/9)

To a reaction vessel charged with DACS (2 eq., 638.63 g as a 35 wt % $CH_2Cl_2$ solution, (delivers 50 mmol of 50/50 IPC/TPC), TEA (2 eq., 111.31 g, 1.1 mol, 153.32 ml) and 4-dimethylaminopyridien (DMA) (catalytic amount) in methylene chloride (5 L) was added a solution of diethylene glycol (58.4 g, 0.55 mol) in methylene chloride (0.5 L) in a small portion. After 30 minutes, resorcinol (1150.65 g, 10.45 mol), $H_2O$ (2 L), methylene chloride (7 L) and phenol (26.35 g, 0.28 mol) were added followed by slow addition of DACS (5167.09 g as a 35 wt % $CH_2Cl_2$ solution, 8.9 mol) while maintaining a pH ~6.5 using 25 wt % aq. NaOH and tapered in the remaining base to reach pH ~7.5. The mixture was kept stirred for additional 30 minutes, hr before addition of BPA (250.8 g, 1.1 mol) and MTBA (50 mL), followed by phosgene (301.65 g, 3.05 mol) while maintaining a pH ~10 using 25 wt % aq. NaOH. The polymer was isolated by hot water crumbing in a blender and collected by filtration and washed with water and dried in a vacuum oven at 110° C. overnight.

Examples 6-13 and Comparative Examples 1-3

Film formation: The polymers synthesized in Examples 1-5 and BPA polycarbonate and ITR/BPA polycarbonate were extruded into 1-5 cm wide, 25-100 μm thick films at 285° C. using a vertical twin screw microcompunder (DACA) at 180-300 rpm. The obtained films were laminated to 10×10×0.5 cm³ BPA-PC plaques containing carbon blacks at 160-170° C.

E-beam irradiation: For e-beam irradiation experiments, equipment with 80-150 kV operating voltage at Advanced Electron Beams Inc. in Wilmington Mass. was used. 125 kV was used as a standard unless otherwise noted. The unit was capable of giving a 5 Mrad dose with each pass. Dosages higher than that were obtained by using multiple passes. E-beam dosages were changed from 0 to 400 Mrad. All the experiments were done under a nitrogen blanket with oxygen concentration of less than 300 ppm unless otherwise noted.

Mar performance measurements: Mar performance of the samples were studied using an Altas Crockmeter with 2 micron polishing paper (3M 281Q WETORDRY PRODUCTION™ Polishing Paper 2MIC) with a felt (Atlas 14995600) sandwiched in between. Mar severity was controlled by the numbers of cycles with a half, two or ten cycles used. A cycle strokes back and forth, and "half" means going one direction once. The following method was used for the evaluation of mar performance: (1) Marred samples were visually compared to the standard samples under "Daylight 65" condition of "GretagMacbeth Spectralight III". The standard samples consist of polymers with different mar performances and they were marred with linen or paper with a different number of cycles to obtain different degree of mar damage severity (visual quality or VQ). They were put into 0 (worst) to 10 (best) scales visually.

Mar performance of the samples was determined for samples with different e-beam active polymers (Examples 6-13). BPA polycarbonate and ITR/BPA polycarbonates were used as comparative examples (Comparative Examples 1-3). The details of the compositions and the experimental conditions employed for Examples 6-13 and Comparative Examples 1-3 are tabulated in Table 1.

TABLE 1

| Example | Polymer | Conc (wt %) | E-beam dosage (Mrad) | VQ |
|---|---|---|---|---|
| 1* | BPA | 100 | — | 1 |
| 2* | BPA | 100 | 200 | 2 |
| 3* | ITR/BPA | 90/10 | — | 3 |
| 4* | ITR/BPA | 90/10 | 100 | 3.5 |
| 6 | DMBPC/BPA | 50/50 | — | 3 |
| 7 | DMBPC/BPA | 50/50 | 200 | 4.5 |
| 8 | ITR/HD/BPA | 86/5/9 | — | 3 |
| 9 | ITR/HD/BPA | 86/5/9 | 100 | 5 |
| 10 | ITR/BD/BPA | 86/5/9 | — | 3 |
| 11 | ITR/BD/BPA | 86/5/9 | 100 | 4 |
| 12 | ITR/DEG/BPA | 86/5/9 | — | 3 |
| 13 | ITR/DEG/BPA | 86/5/9 | 100 | 4.5 |

*Indicates Comparative Examples

The following comparisons are illustrative:

E-beam irradiation of BPA polycarbonate itself improved the mar resistance and changed the VQ from 1 (Comparative Example 1) to 2 (Comparative Example 2). Similarly, e-beam irradiation of ITR/BPA co-polyestercarbonate itself improved the mar resistance and changed the VQ from 3 (Comparative Example 3) to 3.5 (Comparative Example 4).

Addition of DMBPC segment to the polycarbonate backbone also improved the mar performance as the VQ changed from 1 for BPA without any e-beam radiation (Comparative Example 1) to 3 for DMBPC/BPA without any e-beam irradiation (Example 6). However, addition of DMBPC segment to the polycarbonate backbone followed with e-beam irradiation, improved the mar performance significantly as the VQ changed from 2 for BPA with 200 Mrad irradiation (Comparative Example 2) to 4.5 for DMBPC-BPA with 200 Mrad irradiation (Example 7).

Similar trends were also observed for ITR co-polyestercarbonates (Examples 8-13). Addition of the HD, BD or DEG segment in the co-polyestercarbonate without any e-beam irradiation did not result in any significant improvement in mar performance (Examples 8, 10 and 12). However, improved mar performance for all the three co-polyestercarbonates when exposed to 100 Mrad irradiation (Examples 9, 11 and 13).

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims.

What is claimed is:

1. A method for improving the abrasion resistance of a plastic article, said method comprising:
   (a) providing a composition comprising at least one e-beam active co-polyestercarbonate comprising ester structural units derive from a combination of a $C_3$-$C_{40}$ aromatic diol and a diol selected from the group consisting of a $C_2$-$C_{20}$ aliphatic diol, a $C_3$-$C_{40}$ cycloaliphatic diol or a combination thereof;
   (b) forming an article from the composition of step (a); and
   (c) exposing the article formed in step (b) to an electron-beam source.

2. The method according to claim 1, wherein said e-beam active co-polyestercarbonate comprises carbonate structural units of the formula

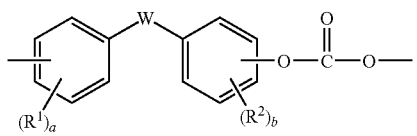

wherein $R^1$ and $R^2$ are independently at each occurrence a halogen atom, a nitro group, a cyano group, a $C_1$-$C_{20}$ aliphatic radical, a $C_3$-$C_{40}$ cycloaliphatic radical, or a $C_3$-$C_{40}$ aromatic radical; W is a $C_1$-$C_{20}$ aliphatic radical, a $C_3$-$C_{40}$ cycloaliphatic radical, or a $C_3$-$C_{40}$ aromatic radical; and "a" and 'b' are independently at each occurrence an integer from 0 to 4, with the proviso that "a+b" is greater than or equal to 1.

3. The method according to claim 2, wherein W is a cyclohexylidene radical and $R^1$ and $R^2$ are both methyl radicals.

4. The method according to claim 1, wherein said e-beam active co-polyestercarbonate comprises carbonate structural units of the formula

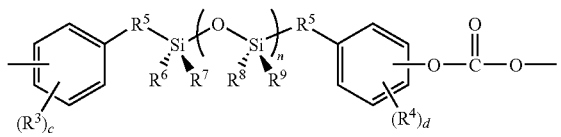

wherein $R^3$ and $R^4$ are independently at each occurrence a halogen atom, a nitro group, a cyano group, a $C_1$-$C_{20}$ aliphatic radical, a $C_3$-$C_{40}$ cycloaliphatic radical, or a $C_3$-$C_{40}$ aromatic radical; $R^5$ is independently at each occurrence a $C_2$-$C_{10}$ aliphatic group or an oxygen atom, $R^6$, $R^7$, $R^8$ and $R^9$ are independently at each occurrence a hydrogen atom, a $C_1$-$C_{20}$ aliphatic radical, a $C_3$-$C_{40}$ cycloaliphatic radical, or a $C_3$-$C_{40}$ aromatic radical; "c" and 'd' are independently at each occurrence an integer from 0 to 4; and "n" is an integer from 0 to 10.

5. The method according to claim 1, wherein said electron-beam active co-polyestercarbonate comprises structural units of the formula

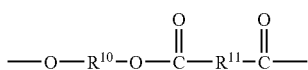

wherein $R^{10}$ comprises a combination of a divalent $C_3$-$C_{40}$ aromatic radical, a radical selected from the group consisting a $C_2$-$C_{20}$ aliphatic radical, a $C_3$-$C_{40}$ cycloaliphatic radical, and a combination thereof, and $R^{11}$ comprises a divalent $C_2$-$C_{20}$ aliphatic radical, a divalent $C_3$-$C_{40}$ aromatic radical, a divalent $C_3$-$C_{40}$ cycloaliphatic radical, or comprises structural units of the formula

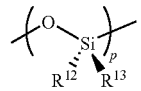

wherein $R^{12}$ and $R^{13}$ are independently at each occurrence a hydrogen atom, a $C_1$-$C_{20}$ aliphatic radical, a $C_3$-$C_{40}$ cycloaliphatic radical, or a $C_3$-$C_{40}$ aromatic radical and "p" is an integer from 1 to 10.

6. The method according to claim 5, wherein $R^{10}$ is an aromatic $C_6$ radical and a radical selected from the group consisting of a hexanediol residue, a butanediol resdue, a diethylene glycol residue, and a combination thereof; and $R^{11}$ is selected from the group consisting of an isophthalic acid, acid halide, or acid ester residue, a terephthalic acid, acid halide, or acid ester residue and a combination thereof.

7. The method according to claim 1, wherein said electron-beam active co-polyestercarbonate comprises at least one terminally connected moiety comprising structural units of the formula

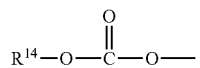

wherein $R^{14}$ is a $C_1$-$C_{20}$ aliphatic radical, a $C_3$-$C_{40}$ cycloaliphatic radical, a $C_3$-$C_{40}$ aromatic radical, or comprises structural units of the formula

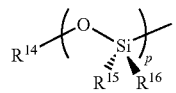

wherein $R^{14}$, $R^{15}$ and $R^{16}$ are independently at each occurrence a hydrogen atom, a $C_1$-$C_{20}$ aliphatic radical, a $C_3$-$C_{40}$ cycloaliphatic radical, or a $C_3$-$C_{40}$ aromatic radical; and "p" is an integer from 1 to 10.

8. The method according to claim 1, wherein said electron-beam active co-polyestercabonate further comprises structural units of the formula

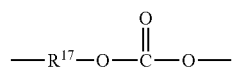

wherein $R^{17}$ is a divalent $C_2$-$C_{20}$ aliphatic radical, a divalent $C_3$-$C_{40}$ aromatic radical, or a divalent $C_3$-$C_{40}$ cycloaliphatic radical.

9. The method according to claim 8, wherein said electron-beam active co-polyestercarbonate comprises bisphenol A polycarbonate structural units.

10. The method according to claim 1, wherein said electron-beam active co-polyestercarbonate comprises structural units of the formula

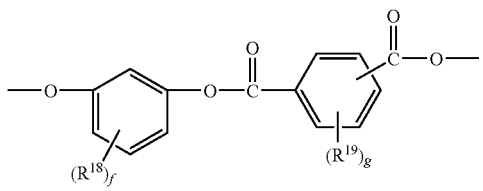

wherein $R^{18}$ and $R^{19}$ are independently at each occurrence a halogen atom, a nitro group, a cyano group, a $C_1$-$C_{20}$ aliphatic radical, a $C_3$-$C_{40}$ cycloaliphatic radical, or a $C_3$-$C_{40}$ aromatic radical; and "f" and "g" are independently at each occurrence an integer from 0 to 4.

11. The method according to claim 1, wherein step (b) comprises extruding said composition to form an article, which is a film.

12. The method according to claim 11, wherein said film has a thickness in a range from about 10 microns to about 1000 microns.

13. The method according to claim 1, wherein step (b) comprises co-extruding said composition with a second polymeric material to form a multi-layered article.

14. The method according to claim 13, wherein said second polymeric material is selected different from said electron-beam active thermoplastic polymeric material provided in step (a), and said second polymeric material is selected from the group consisting of polycarbonates, co-polycarbonates, co-polyestercarbonates, and combinations thereof.

15. The method according to claim 1, wherein step (b) comprises solvent casting said composition to form a film.

16. The method according to claim 1, wherein said exposing is conducted in the presence of nitrogen or hydrogen.

17. The method according to claim 1, wherein said exposing is conducted in vacuum.

18. The method according to claim 1, wherein the electron beam source has an operating voltage in the range from about 80 kV to about 20 MV.

19. The method according to claim 1, wherein the electron beam source has an operating voltage of about 150 kV.

20. The method according to claim 1, wherein said exposing to an electron beam source results in an electron beam dosage in the range from about 1 Mrad to about 5000 Mrad.

21. An article comprising an abrasion resistant surface; wherein said article is prepared by a method comprising:
(a) providing a composition comprising at least one electron-beam active co-polyestercarbonate comprising ester structual units derived from a $C_3$-$C_{40}$ aromatic diol and a diol selected from the group consisting of a $C_2$-$C_{20}$ aliphatic diol, a $C_3$-$C_{40}$ cycloaliphatic diol, or a combination thereof;
(b) forming an article from the composition of step (a); and
(c) exposing the article formed in step (b) to an electron-beam source.

22. A method for improving the abrasion resistance of a plastic article, said method comprising:
(a) providing a composition comprising at least one e-beam active co-polyestercarbonate comprising ester structural units of the formula

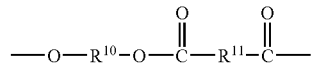

wherein $R^{10}$ is a $C_2$-$C_{20}$ aliphatic radical and $R^{11}$ is a divalent $C_3$-$C_{40}$ aromatic radical,
ester structural units of the formula

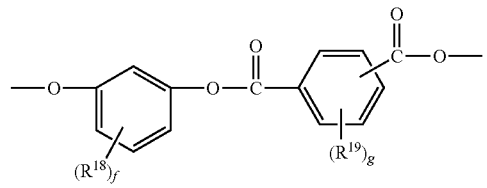

wherein $R^{18}$ and $R^{19}$ are independently at each occurrence a halogen atom, a nitro group, a cyano group, a $C_1$-$C_{20}$ aliphatic radical, a $C_3$-$C_{40}$ cycloaliphatic radical, or a $C_3$-$C_{40}$ aromatic radical; and "f" and "g" are independently at each occurrence an integer from 0 to 4; and
carbonate structural units of the formula

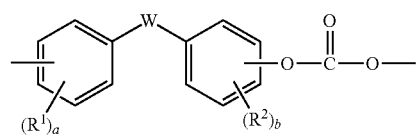

wherein $R^1$ and $R^2$ are independently at each occurrence a halogen atom, a nitro group, a cyano group, a $C_1$-$C_{20}$ aliphatic radical, a $C_3$-$C_{40}$ cycloaliphatic radical, or a $C_3$-$C_{40}$ aromatic radical; W is a $C_1$-$C_{20}$ aliphatic radical, a $C_3$-$C_{40}$ cycloaliphatic radical, or a $C_3$-$C_{40}$ aromatic radical; and "a" and 'b" are independently at each occurrence an integer from 0 to 4;
(b) forming an article from the composition of step (a); and
(c) exposing the article formed in step (b) to an electron-beam source.

* * * * *